United States Patent
Wasielewski et al.

(10) Patent No.: US 8,327,551 B2
(45) Date of Patent: Dec. 11, 2012

(54) ATTACHMENT INTERFACE FOR ROTARY HAND TOOLS

(75) Inventors: Kevin Wasielewski, Schaumburg, IL (US); Josh Barhitte, Chicago, IL (US); Timothy Baker, Aurora, IL (US)

(73) Assignee: Robert Bosch GmbH, Stuttgart (DE)

( * ) Notice: Subject to any disclaimer, the term of this patent is extended or adjusted under 35 U.S.C. 154(b) by 451 days.

(21) Appl. No.: 12/700,003

(22) Filed: Feb. 4, 2010

(65) Prior Publication Data

US 2011/0188957 A1 Aug. 4, 2011

(51) Int. Cl.
*B23B 51/00* (2006.01)
*B25F 5/02* (2006.01)

(52) U.S. Cl. .......................... 30/500; 30/392

(58) Field of Classification Search .......... 30/296.1, 30/392, 166.3, 500
See application file for complete search history.

(56) References Cited

U.S. PATENT DOCUMENTS

| | | | | |
|---|---|---|---|---|
| 2,703,928 A * | 3/1955 | Southwick | | 30/386 |
| 3,158,933 A * | 12/1964 | Davis et al. | | 30/276 |
| 3,657,813 A * | 4/1972 | Knight | | 30/373 |
| 3,715,805 A * | 2/1973 | Fraser | | 30/166.3 |
| 4,654,971 A * | 4/1987 | Fettes et al. | | 30/383 |
| 4,714,447 A * | 12/1987 | Hironaka | | 464/52 |
| 4,733,471 A * | 3/1988 | Rahe | | 30/276 |
| 5,718,050 A * | 2/1998 | Keller et al. | | 30/123.4 |
| 5,961,207 A * | 10/1999 | Petkovic | | 362/376 |
| 6,048,260 A | 4/2000 | Kopras | | |
| 6,182,367 B1 * | 2/2001 | Janczak | | 30/392 |
| D453,921 S * | 2/2002 | Bussett et al. | | D13/133 |
| 6,592,392 B2 * | 7/2003 | Po-Heng | | 439/358 |
| 7,484,300 B2 * | 2/2009 | King et al. | | 30/296.1 |
| 7,913,403 B1 * | 3/2011 | Willetts | | 30/392 |
| 7,930,833 B2 * | 4/2011 | Baskar et al. | | 30/517 |
| 8,020,304 B2 * | 9/2011 | Mace et al. | | 30/381 |
| 8,191,268 B2 * | 6/2012 | Willetts | | 30/392 |
| 2002/0194739 A1 * | 12/2002 | Krane et al. | | 30/296.1 |
| 2003/0044252 A1 | 3/2003 | Landt | | |
| 2003/0223836 A1 | 12/2003 | Pozgay et al. | | |
| 2005/0048884 A1 | 3/2005 | Baker | | |
| 2007/0193038 A1 * | 8/2007 | Dahlberg | | 30/296.1 |
| 2009/0208309 A1 * | 8/2009 | Engelbrecht | | 411/318 |
| 2010/0180454 A1 * | 7/2010 | Cheng | | 30/388 |
| 2011/0101681 A1 * | 5/2011 | O'Connor | | 285/259 |

* cited by examiner

Primary Examiner — Sean Michalski
(74) Attorney, Agent, or Firm — Greer, Burns & Crain, Ltd.

(57) ABSTRACT

Embodiments of the present invention are directed to an attachment interface for a handheld power tool having an elongated housing and a rotary output shaft, the interface comprising a nose portion having a generally cylindrically shaped wall extending in the direction of the center axis to a flat annular surface, a plurality of screw threads formed in an outer surface of the wall configured to have an attachment device with a screw threaded collar mounted on the interface, and a first plurality of keys formed in an inner surface of the wall configured to receive have an attachment device with a second plurality of complementary keys, the engaged keys preventing rotation of the attachment device when the attachment device is mounted on the interface.

19 Claims, 6 Drawing Sheets

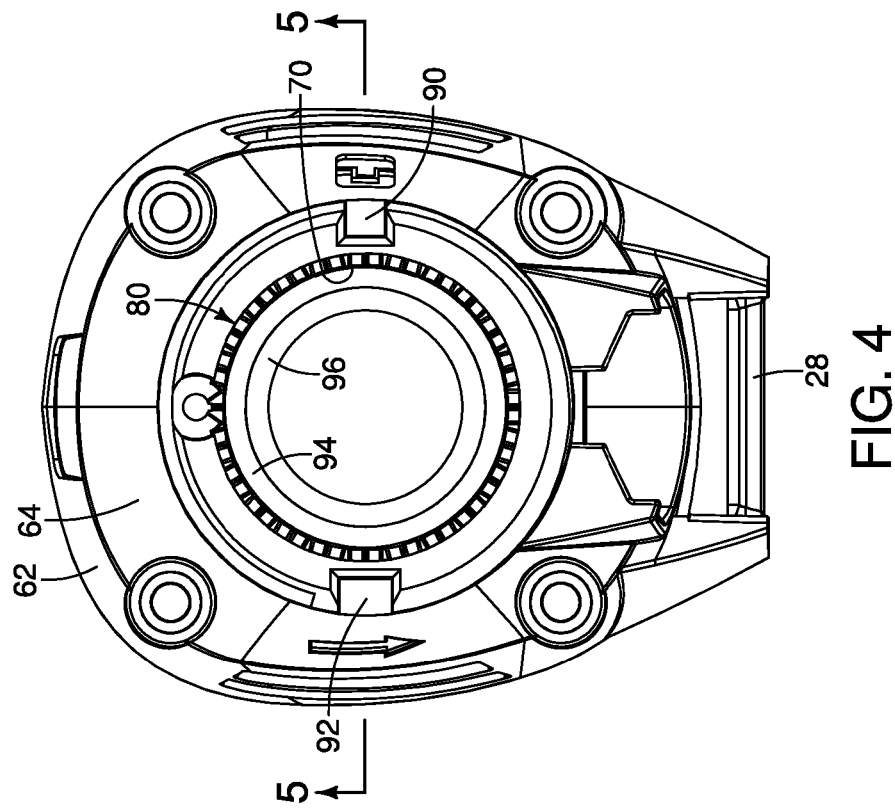
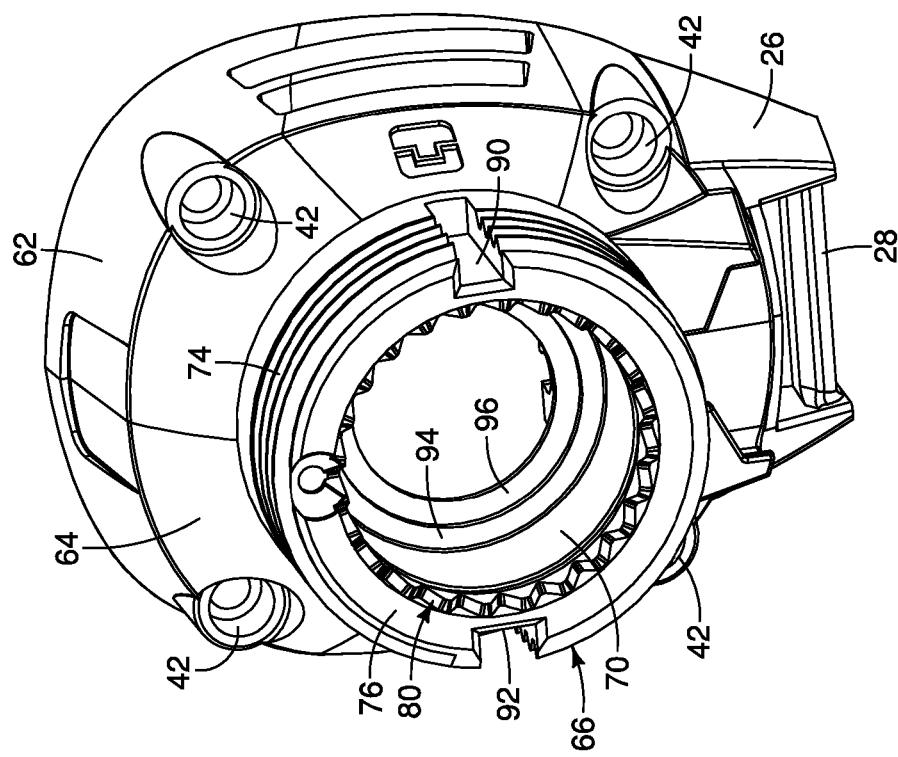

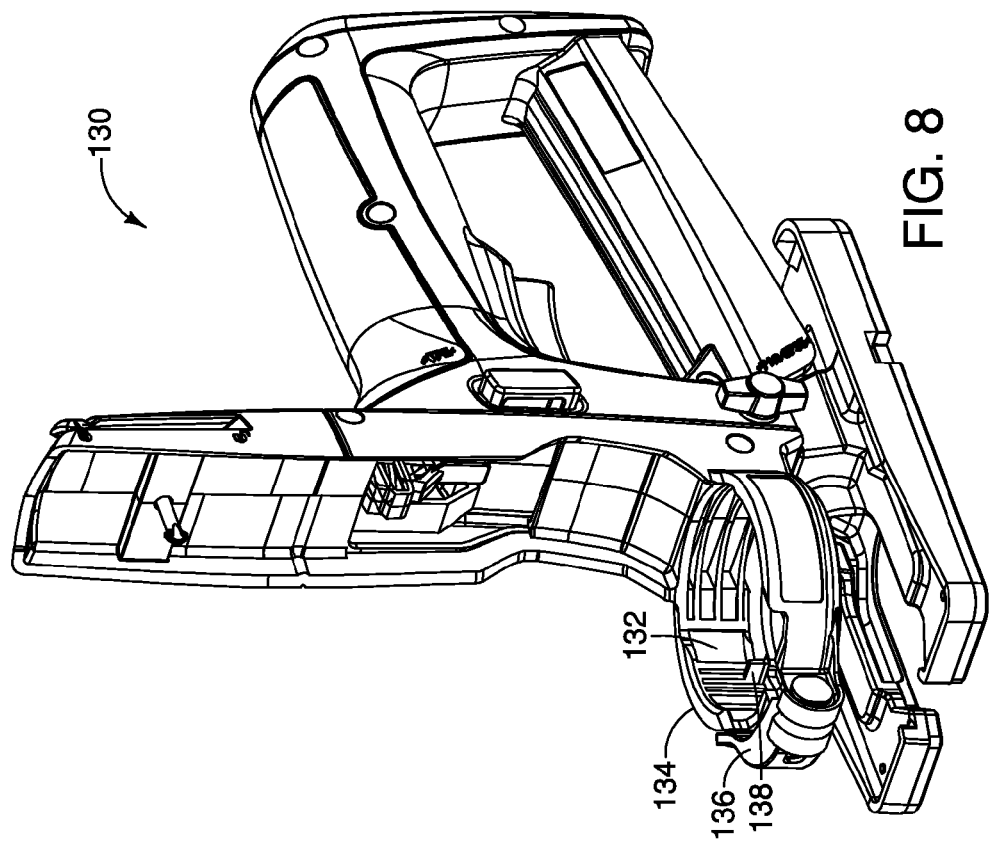
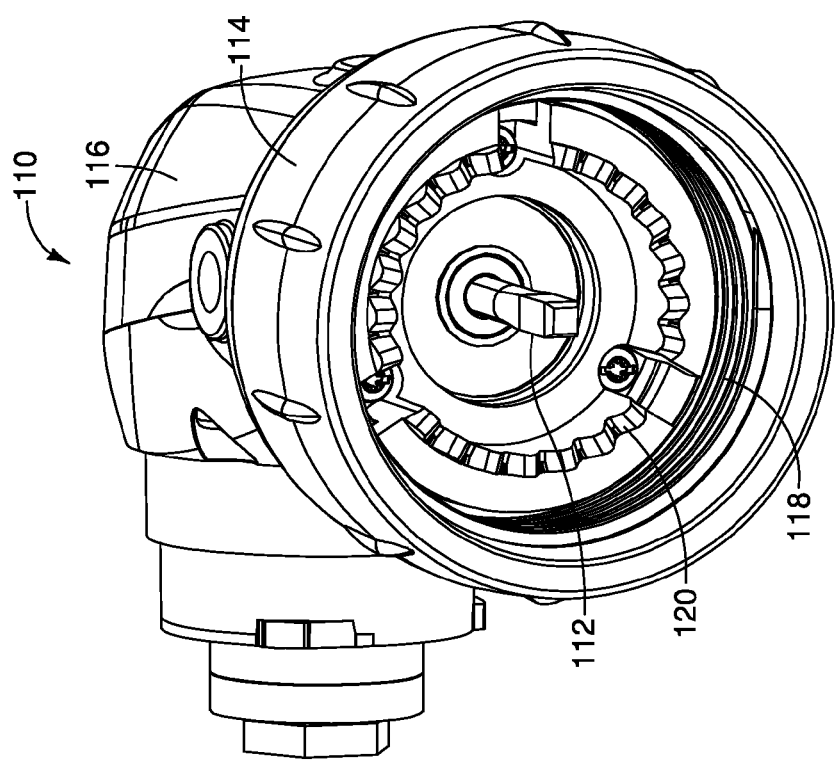
FIG. 7
FIG. 8

ATTACHMENT INTERFACE FOR ROTARY HAND TOOLS

BACKGROUND OF THE INVENTION

The present invention generally relates to small rotary handheld power tools, and more particularly to an attachment interface for such tools.

Small handheld rotary power tools that perform drilling, sawing and other types of cutting and the like are known in the prior art and have been widely used by hobbyists, artisans, tradesmen and others in a wide variety of applications. Such rotary hand tools generally have a motor with a rotary output shaft that extends from a nose portion that is configured to have various accessories or attachment devices mounted thereon. Some of these rotary hand tools are quite powerful for their size and are often used by tradesmen in the building trades as spiral saws that have a side cutting rotary bit to penetrate and rapidly cut holes in drywall sheets for electrical switches, outlets, light fixtures and the like.

As is known in the art, such rotary hand tool tasks can be more easily performed by using an attachment device that is attached to the tool. For example, a depth adjustment attachment device is often used with such a spiral saw to limit the penetration of a cutting bit in a drywall sheet. Other types of attachment devices have been developed which increase the types of applications that can be carried out, such as an attachment device which incorporates a rotating saw blade that may be oriented perpendicular to the axis of the output shaft of the hand tool, or at other orientations. Other types of attachment devices may be used to facilitate increased control for delicate and/or accurate detail cutting. There are an increasing number of such attachment devices which increase the range of applications and use of such hand tools.

While all of such attachment devices have an attachment interface that is used to mount and often adjust the position of the attachment device on the hand tool, users welcome attachment interfaces which offer added benefits of convenience in attachment, efficiency and ease to use.

SUMMARY OF THE INVENTION

Embodiments of the present invention are directed to an attachment interface for a handheld power tool having an elongated housing and a rotary output shaft with a center axis, the shaft being accessible through a forward end of the housing, the interface comprising a nose portion on the forward end of the housing, the nose portion having a central opening for accessing the output shaft, a transition portion between the forward end of the housing and the nose portion wherein the transition portion has an inclined outer surface extending radially inwardly toward the output shaft axis, the nose portion having a generally cylindrically shaped wall extending from the transition portion concentrically in the direction of the center axis to a transverse annular flat surface at the front end thereof, a plurality of screw threads formed in an outer surface of the wall configured to have an attachment device with a screw threaded collar mounted on the interface, the collar being screwed onto the nose portion to secure the same thereto, and a first plurality of keys formed in an inner surface of the wall configured to receive have an attachment device with a second plurality of complementary keys that engage at least some of the keys of the inner surface when the attachment device is mounted on the interface, the engaged keys preventing rotation of the attachment device when the attachment device is mounted on the interface.

Other embodiments comprise an attachment interface as described above that includes at least one recess oriented parallel to the center axis located in the outer surface configured to receive an attachment device with a complementarily shaped rib to prevent rotation of the attachment device on the nose portion when the attachment device is mounted on the interface.

DESCRIPTION OF THE DRAWINGS

FIG. 3 is a front left isometric view of a portion of the hand tool shown in FIG. 2, and particularly illustrating a front portion of the attachment interface;

FIG. 4 is a front plan view of the attachment interface shown in FIG. 3;

FIG. 7 is an isomeric view of a right angle attachment device that is configured to be mounted on the power tool shown in FIGS. 1 and 2;

FIG. 8 is an isomeric view jigsaw handle attachment device that is configured to be mounted on the power tools of FIGS. 1 and 2.

DETAILED DESCRIPTION

The present invention is directed to an improved attachment interface for a handheld power tool of the type which has an elongated housing and an output shaft that has a center axis and a forward housing portion through which access to the output shaft is provided. While it is particularly suited for a power tool having a rotary output shaft, a reciprocating or oscillatory type output shaft may also be a type of tool in which the attachment interface may be used.

An advantage of the particular attachment interface of the present invention is that it provides a secure means for mounting and fastening attachment devices to the tool in a safe manner, while still allowing for quick assembly and disassembly and in certain types of applications and uses, desired adjustability for angularly positioning attachment devices to a power tool. The attachment interface has multiple features which are designed into the interface so that various features can be employed for various types of attachment devices to either retain or prevent movement in the direction of the longitudinal axis of the power tool, enable or prevent rotational adjustability of the attachment device relative to the longitudinal axis of the tool, provide for attachment, adjustment and removal or disassembly of an attachment device in a tool-less manner, provide such capabilities in a relatively simple and inexpensive manner and provide for increased user safety by enabling removal of an attachment device through either a two-step process, or multiple repeated actions. By carefully designing and configuring attachment devices, depending upon the tasks for which they are designed to carry out, utilization of one or more of the design features of the interface can be employed.

Figure 1:
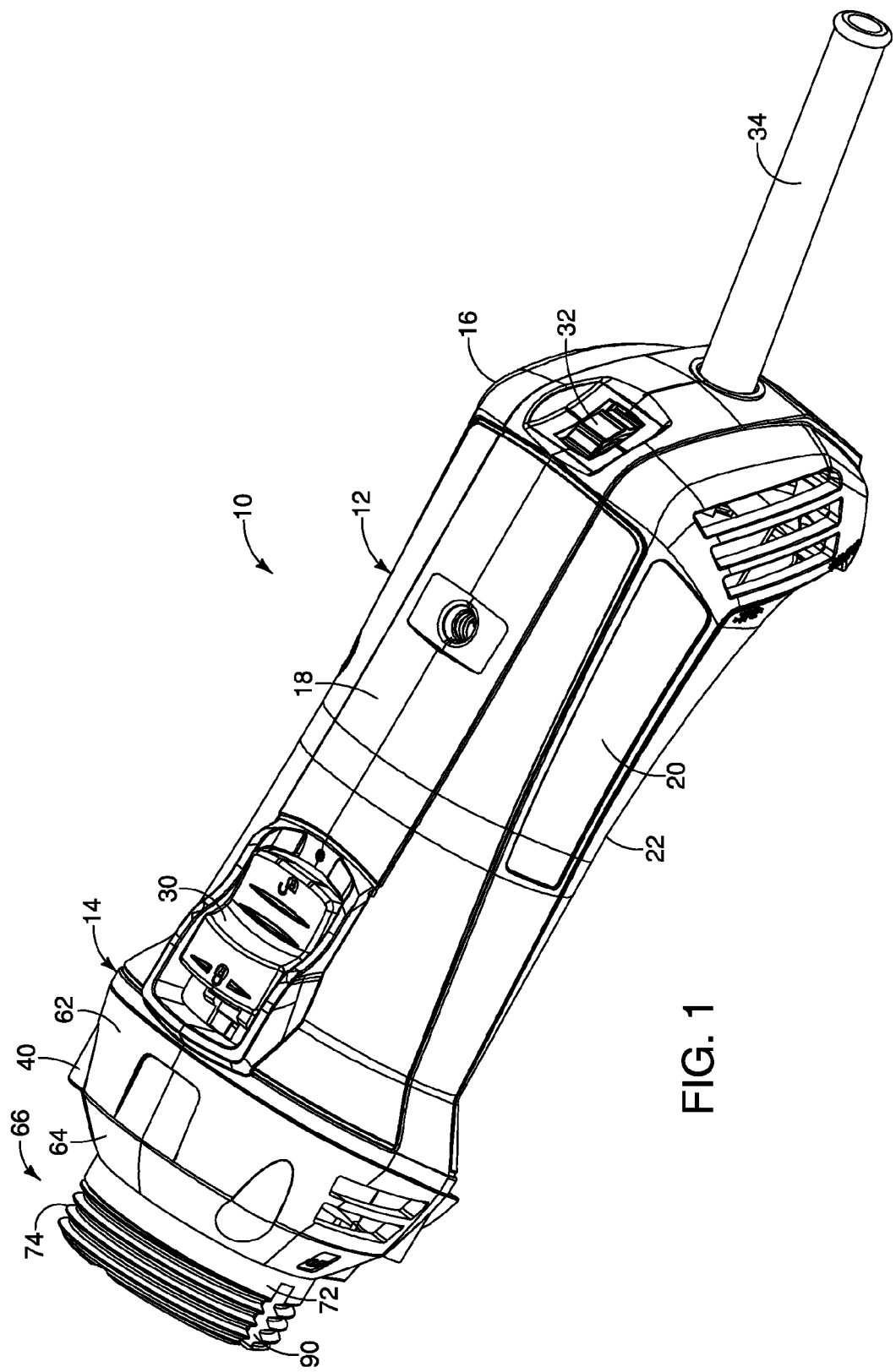
FIG. 1 is a top left isometric view of a handheld power tool embodying the present invention.
Figure 2:
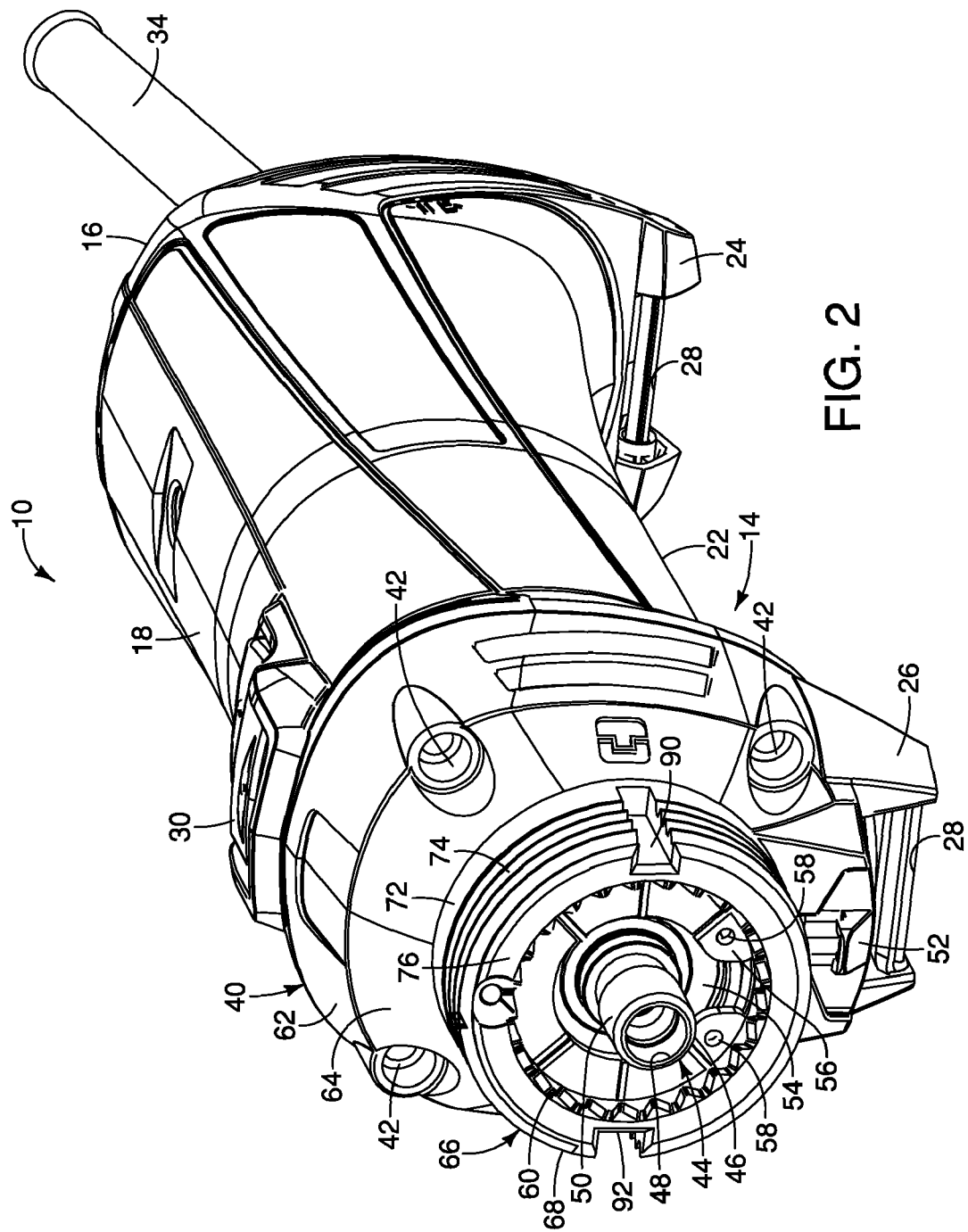
FIG. 2 is a front left isometric view of the power tool shown in FIG. 1.
Figure 6:
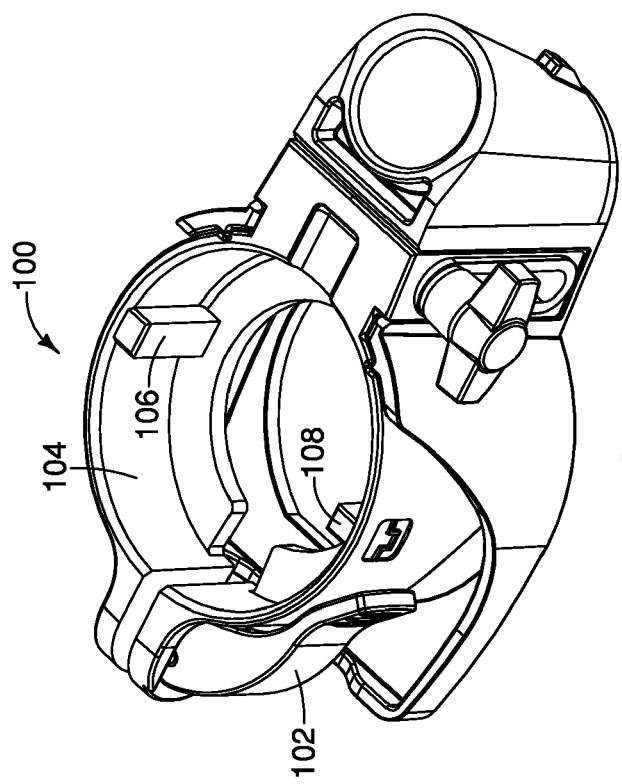
FIG. 6 is an isomeric view of a depth guide attachment device that is configured to be mounted on the power tool shown in FIGS. 1 and 2.

Turning now to the drawings and particularly FIGS. 1 and 2, an elongated power tool, indicated generally at 10, is shown and has an elongated housing, indicated generally at 12, a forward end portion, indicated generally at 14, and a rear end portion, indicated generally at 16. The housing has a top surface 18, side surfaces 20 and a bottom surface 22 in which a motor is contained. The size of the housing 12 is such that most users can grip the tool with one hand with their fingers curling around under the bottom portion 22. The forward end portion 14 as well as the rear end portion 16 are provided with downward extensions 24 and 26, respectively, with each having a cylindrical pin 28 around which a flexible strap (not shown) can be placed, with the strap being positioned to bear upon the outside of the user's fingers to facilitate holding the tool during use.

When a person is holding the tool 10 as described, their thumb is in position to operate a switch 30 which turns on the motor for operating the tool. The switch 30 is preferably designed so that it is in the OFF position as shown in FIG. 1 and can be switched ON by the user pushing the switch 30 forwardly. A rotating wheel 32 located at the rear end 16 of the tool may be provided with the functionality of changing the operating speed of the tool motor. The particular tool 10 shown in FIGS. 1 and 2 has a power cord 34 that can be plugged into a source of AC power. It should be understood that power tools similar to that shown in FIGS. 1 and 2 may incorporate battery packs, and in such event, they may be slightly larger. However, the attachment interface of the present invention may be employed with such a tool.

An attachment interface, indicated generally at 40, is secured to the forward end portion 14 of the tool. The attachment interface is shown to be a separate part that is secured to the forward end portion 14 of the housing 12 and is designed and configured to be strong and durable so that it can withstand the rough use that is often occasioned by tradesmen, particularly those in the building trades where such tools are often used. Alternatively, the attachment interface may be manufactured as part of the housing, which is preferably formed of two mating halves that are connected together. For this reason, it is preferable that the attachment interface 40 be made of relatively strong material, such as a strong plastic or plastic-like material, aluminum or steel, with aluminum being preferred because of its lighter weight. Such a plastic material can be glass filled nylon for example.

The attachment interface is preferably secured to the forward end portion of the housing 12 by screws (not shown) which fit within recesses 42. The remainder of the housing 12 is preferably made of a strong and durable plastic or plastic-like material, such as glass filled nylon that will not crack or otherwise break if dropped or harshly treated. The tool has an output shaft, indicated generally at 44, which is best shown in FIG. 2. The output shaft comprises a generally cylindrical outer end 46 having a cylindrical opening 48, with the outside surface 50 being preferably threaded to receive a collet nut 50 in threaded engagement, with a collet being placed inside of the cylindrical opening 48, the collet and nut securing a spiral or other type of rotating bit or tool to the output shaft 44.

It should be understood that the output shaft 44 may be an elongated shaft portion that is attached to the armature shaft of the motor. The output shaft 44 preferably has a center portion which is located rearwardly of the cylindrical open 48, with the portion having a generally square cross-sectional cavity that is designed and configured to receive a drive shaft of an attachment device. The output shaft 44 may also have radially oriented openings for receiving a shaft lock pin (not shown) that is provided, with a shaft lock pushbutton 52 being provided. The pushbutton 52 can be moved radially inwardly toward the output shaft 44 by a user and when the pin engages the opening, will lock the output shaft from being rotated, which enables certain types of tools to be attached to the attachment interface. Most often, it allows the output shaft to be locked so that a collet nut can be tightened and loosened on the output shaft to firmly retain or remove a tool bit.

The output shaft 44 is also provided with a front bearing 54 having an inner race that is in contact with the output shaft 44 and an outer race that bears against an inner wall of the attachment interface, with the tool also having a retaining ring 56 that is shown to have a gap between the ends thereof, with the ends having end holes 58. The end holes facilitate placement and removal of the ring 56. The front bearing provides protection and stability for the output shaft if side forces are applied to it. The retaining ring 56 may have raised ribs 60 positioned around the perimeter thereof for providing extra strength to the retaining ring.

The attachment interface 40 has a base or mounting portion 62 that is designed and configured to meet with the forward end 14 of the housing 12. The mounting portion 62 merges with a transition portion 64 that has an inclined outer surface that extends radially inwardly as well as circumferentially subs around a substantial portion of the periphery of the interface. The transition portion then merges with a nose portion, indicated generally at 66, which comprises a cylindrical wall 68 having a generally smooth cylindrical inner wall 70 and an outer wall 72 in which a number of threads 74 are formed. The outer end surface 76 is relatively wide and flat and presents an annular surface against which a suitably designed attachment device can seat against when it is mounted and secured to the tool.

In this regard, the outer diameter of the cylindrical wall is approximately 57 millimeters, for this type of tool shown, but could be larger or smaller if desired. With such a diameter, the thickness of the annular surface 76 can vary between approximately 3.6 and 8.4 millimeters.

The threads 74 are shown to extend from near the transition portion 64 outwardly to the end surface 76 and are shown to number approximately 4-5 turns. This number of turns provides threads having a depth that is relatively large and therefore will not be easily damaged to a point where they are not functional, but provide a sufficient number of turns so that an attachment device that is of the type which may wear and be axially adjustable can be further tightened without running out of threads. Also, it is desired that an attachment device that is threaded onto the nose portion cannot be removed without multiple actions by a user, i.e., it requires a user to regrip the attachment device more than once to accomplish separation of the attachment device threaded portion from the nose portion 66 of the attachment interface 40.

Certain types of attachment devices are desirably designed and configured so that they can only be mounted and secured to a tool in a single position. Thus, rotational adjustment of such devices is intended to be prevented. Other types of attachment devices may desirably be mounted in different rotational positions, and in that event, other features of the attachment interface 40 facilitate such adjustability, but also firmly retain the attachment device from being rotated when it is secured to the attachment interface 40.

Figure 5:
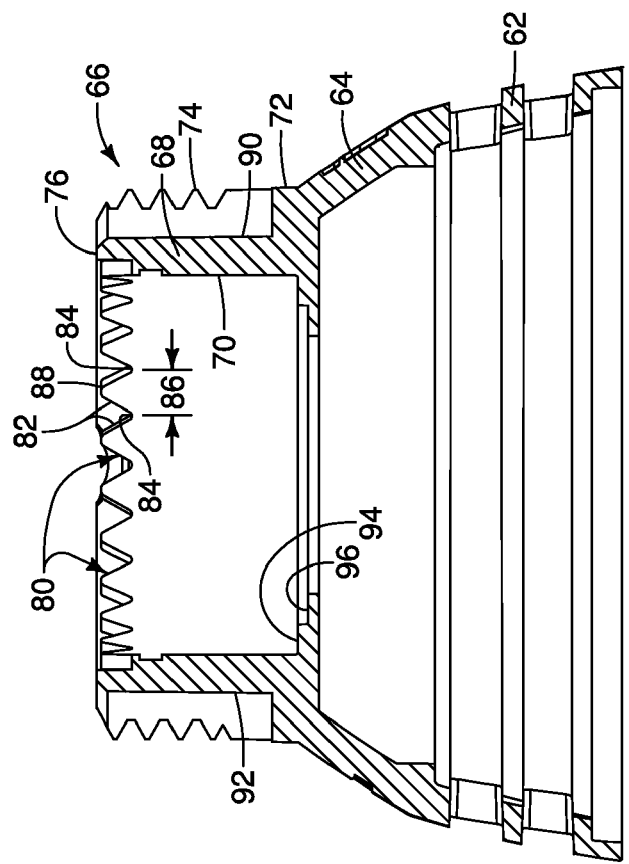
FIG. 5 is a cross section taken generally along the line 5-5 of FIG. 4.

Thus, as shown in FIGS. 2-5, the inside surface 70 of the wall 68 has a number of keys, indicated generally at 80, that are formed in the wall 68 and extend substantially around the periphery of the cylindrical inside wall 70. As best shown in FIG. 5, the width of the keys 80 is relatively small, i.e., within the range of approximately 2-4 millimeters. As is evident from the drawings, the keys 80 are generally contiguous with one another and have a zigzag appearance. As defined herein, a key is defined as a recess with inclined side walls 82 that meet one another at a bottom intersection 84.

As shown in the drawings, the intersections 84 of adjacent keys is shown at 86 and this distance is preferably constant around the periphery of the plurality of keys shown. As is also evident from FIG. 5, the top surface 88 between the side surfaces 82 of adjacent keys 80 is relatively flat and terminates immediately below the annular flat end surface 76 of the nose portion 66. It is preferred that the angle of the side surfaces 82 relative to the axis of the output shaft 44 be within the range of about 30-60°, the important consideration being that it provides sufficient depth so that an attachment device that has similar contacting surfaces, i.e., keys that are complementary to those shown for the accessory interface, will suitably mate and prevent relative rotation between the two components when the attachment device is secured in place.

The accessory interface 40 also has a pair of external recesses 90 and 92 located in the outer surface 72 of the wall 68, with the recesses being oriented parallel to the axis of the output shaft 44. The recesses 90 and 92 interrupt the threads 74 and are configured to receive a corresponding rib of an attachment device that may be mounted on the accessory interface 40. As shown in FIGS. 2, 3 and 4, the recesses have a chamfered outer surface that functions as a guide to enable the leading edge of a rib to more easily enter the recess during mounting of an attachment device to the accessory interface.

It is preferred that the recesses 90 and 92 be of different sizes, in the event that an attachment device can be mounted in only one position and in that event, the attachment device may have a narrow rib as well as a wider one, with the wider one being incapable of being inserted into the narrow recess 90. It should also be understood that a single recess may be desirably used on the accessory interface which would have the same functionality. The axial oriented recesses 90 and 92 perform the function of preventing rotation of an attachment device on the accessory interface, while enabling the depth or axial position to be adjusted for reasons of wear, convenience or the like.

An example of an attachment device which is designed and configured to be mounted on the accessory interface 40 is a depth guide, indicated generally at 100, which has a clamping handle 102 that causes the interior surface of a split cylindrical portion 104 to be clamped against the thread 74 of the attachment interface 40. The depth guide 100 has a wide rib 106 and a narrow rib 108 that are configured to fit within the respective recesses 92 and 90. These ribs will prevent the depth guide from rotating relative to the attachment interface 40.

Another attachment device that can be mounted on the tool 10 is a right angle attachment, indicated generally at 110 which has an input shaft 112 that is shown to have a square outer end and is designed to be inserted into the output shaft 44 and engage a square cavity that is rearwardly of the part of the opening that is visible in FIG. 2. The right angle attachment device 110 has an outer collar 114 that is rotatable relative to a housing 116 and which has interior threads 118 that are sized and configured to be threaded onto the threads 74 of the attachment interface 40. The angular position of the housing can be adjusted by virtue of the fact that the housing 116 has a plurality of keys in an annular ring, with the diameter of the annular ring of keys being generally identical to the keys 80 of the attachment interface 40. The keys 120 are complementarily shaped so that they mesh or mate with the keys 80 and are therefore designed to permit rotational adjustment of the housing 116 relative to the tool 10, but when the collar 114 is tightened, the housing is prevented from rotating relative to the tool housing.

Figure 9:
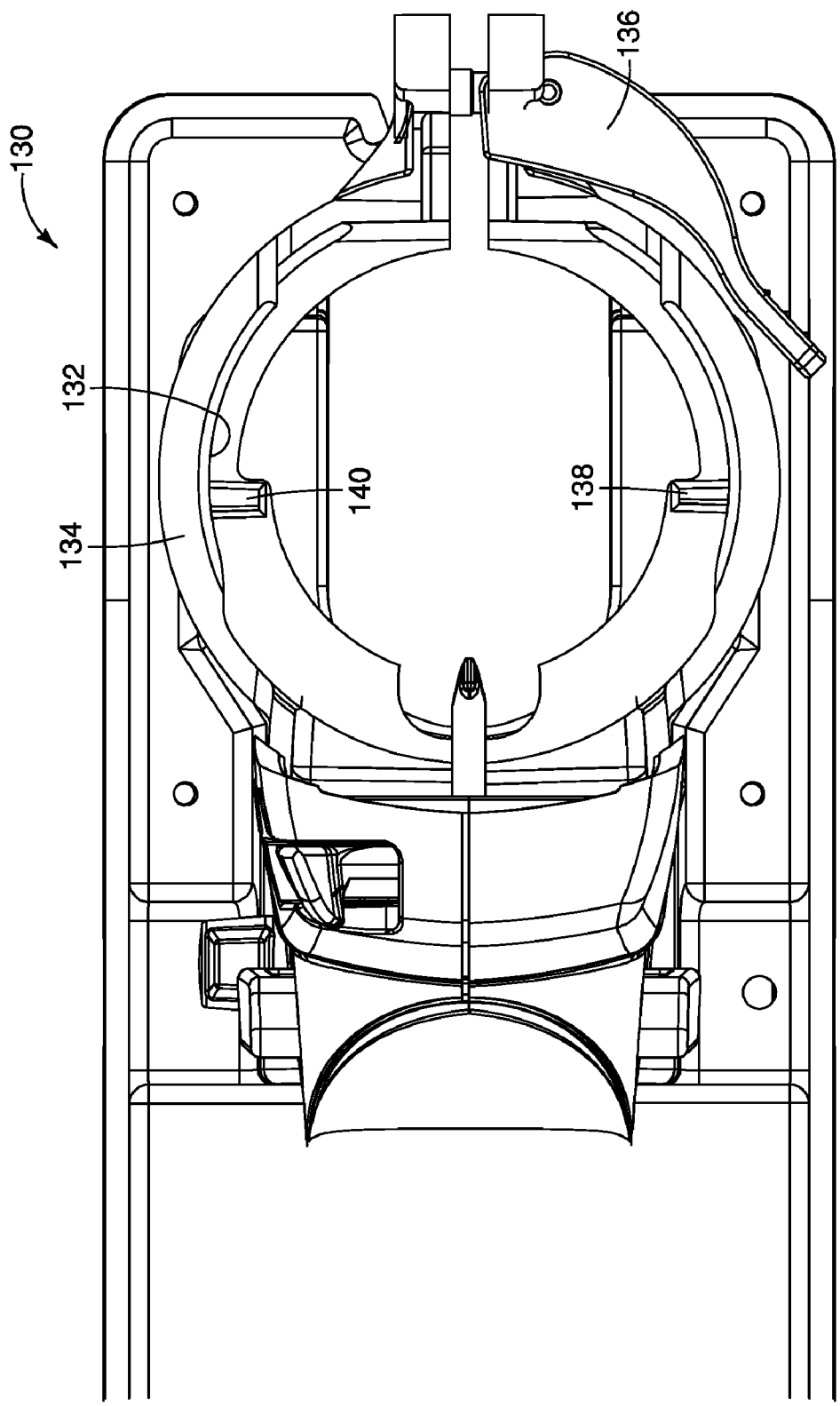
FIG. 9 is top plan view of a portion of the jigsaw hand attachment device shown in FIG. 8.

Another attachment device that can be mounted to the attachment interface 40 is a jigsaw handle attachment, indicated generally at 130 and shown in FIGS. 8 and 9, which also has an inside cylindrical surface 132 of a split cylindrical portion 134 that includes a clamping handle 136 for urging the surface 132 into tight engagement with the threads 74 of the wall 68 of the attachment interface. The attachment 130 has ribs 138 and 140 which are configured to engage the axial recesses 90 and 92, respectively, on the attachment interface 40. Thus, the tool will be correctly positioned in the jigsaw handle accessory when the tool is placed in it and the ribs not only prevent it from being seated unless it is in the correct position, but it will thereafter prevent rotational movement of the tool relative to the jigsaw handle accessory 130.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. An attachment interface for a handheld power tool having an elongated housing and a rotary output shaft with a center axis, the shaft being accessible through a forward end of the housing, said interface comprising:
   a nose portion on the forward end of the housing, said nose portion having a central opening for accessing the output shaft;
   a transition portion between the forward end of the housing and said nose portion wherein said transition portion has an inclined outer surface extending radially inwardly toward the output shaft axis;
   said nose portion having a generally cylindrically shaped wall extending from said transition portion concentrically in the direction of the center axis to a transverse annular flat surface at the front end thereof;
   a plurality of screw threads formed in an outer surface of said wall configured to have an attachment device with a screw threaded collar mounted on said interface, the collar being screwed onto said nose portion to secure the same thereto; and
   a first plurality of keys formed in an inner surface of said wall configured to receive have an attachment device with a second plurality of complementary keys that engage at least some of said keys of said inner surface when said attachment device is mounted on said interface, said engaged keys preventing rotation of said attachment device when said attachment device is mounted on said interface.

2. An attachment interface as defined in claim 1 wherein said interface further comprises at least one recess oriented parallel to said center axis located in said outer surface configured to receive an attachment device with a complementarily shaped rib to prevent rotation of said attachment device on said nose portion when said attachment device is mounted on said interface.

3. An attachment interface as defined in claim 2 wherein said interface comprises two of said recesses positioned radially opposite one another, said recesses having a depth in the radial direction that exceeds the depth of said screw threads located in said wall.

4. An attachment interface as defined in claim 3 wherein the size of said two recesses is different from one another, so that an attachment device with two complementarily shaped ribs positioned radially opposite one another, one of which is sized to be larger than one of said recesses can only be mounted on said interface at a single angular position.

5. An attachment interface as defined in claim 1 wherein said interface is formed as an integral unit that is attached to the housing with a number of fasteners.

6. An attachment interface as defined in claim 5 wherein said interface is formed of metal or a plastic or plastic-like material.

7. An attachment interface as defined in claim 6 wherein said interface is an aluminum casting.

8. An attachment interface as defined in claim 1 wherein said plurality of screw threads extend from said transverse annular flat portion rearwardly within the range of about 2 to about 6 rotations thereby providing axial adjustment of an attachment device relative to said interface.

9. An attachment interface as defined in claim 1 wherein said keys having side surfaces forming a generally V-shaped configuration, said keys being located generally completely around the periphery of said inner surface of said wall, the distance between the intersection of said side surfaces between adjacent keys is substantially constant.

10. An attachment interface as defined in claim 9 wherein the angle between said side surfaces of said keys is within the range of about 30 degrees to about 60 degrees.

11. An attachment interface as defined in claim 10 wherein the outer surface of adjoining side surfaces of adjacent keys is truncated so that it does not extend beyond said annular flat surface of said wall.

12. An attachment interface as defined in claim 11 wherein said wall has an outer diameter of about 54 millimeters and a thickness within the range of about 3.6 to about 8.4 millimeters, and said keys have a radial thickness of about 4 millimeters.

13. An attachment interface for a handheld power tool having an elongated housing and a rotary output shaft with a center axis, the shaft extending forwardly from the housing, said interface comprising a nose portion that is secured to the housing, said nose portion comprising:
   a structure that is configured to be attached to a forward end portion of the housing and having a central opening concentric with the center axis for accessing the output shaft;
   a transition portion with an outer peripheral surface that slopes radially inwardly toward the center axis from the interface with the housing in the forward direction;
   a generally cylindrically shaped wall extending from a forward end of said transition portion concentric with and in the direction of the center axis to a transverse annular flat surface at a front end thereof;
   a plurality of screw threads formed in an outer surface of said wall configured to have an attachment device mounted on said interface, the attachment device being of the type which has a screw threaded collar, wherein the collar is screwed onto said nose portion to secure the same thereto;
   at least one recess oriented parallel to said center axis located in said outer surface, said recess being configured to receive an attachment device of the type which has a complementarily shaped rib to prevent rotation of said attachment device on said nose portion when said attachment device is mounted on said interface;
   a first plurality of keys formed in an inner surface of said wall configured to have an attachment device of the type which has a second plurality of complementary keys that engage at least some of said keys of said inner surface when said attachment device is mounted on said interface, said engaged keys preventing rotation of said attachment device when said attachment device is mounted on said interface.

14. An attachment interface as defined in claim 13 wherein said nose portion is molded from a strong plastic or plastic-like material and is attached to the housing with a number of fasteners.

15. An attachment interface as defined in claim 13 wherein said interface comprises two of said recesses positioned radially opposite one another, said recesses having a depth in the radial direction that exceeds the depth of said screw threads located in said wall.

16. An attachment interface as defined in claim 15 wherein the size of said two recesses is different from one another, so that an attachment device with two complementarily shaped ribs positioned radially opposite one another, one of which is sized to be larger than one of said recesses can only be mounted on said interface at a single angular position.

17. An attachment interface as defined in claim 13 wherein said attachment device of the type which has a screw threaded collar is a right angle undercut rotary saw attachment.

18. An attachment interface as defined in claim 13 wherein said attachment device of the type which has a complementarily shaped rib to prevent rotation of said attachment device on said nose portion when said attachment device is mounted on said interface is a depth guide attachment or a jig saw handle attachment.

19. An attachment interface as defined in claim 13 wherein said attachment device of the type which has a second plurality of complementary keys that engage at least some of said keys of said inner surface when said attachment device is mounted on said interface is right angle undercut rotary saw attachment.

* * * * *